United States Patent [19]

Newman et al.

[11] 3,721,905

[45] March 20, 1973

[54] PULSE TRAIN SORTER

[75] Inventors: Walter C. Newman, Sunnyvale; Andrew R. Cohen, Delmar, both of Calif.

[73] Assignee: Itek Corporation, Lexington, Mass.

[22] Filed: Aug. 11, 1971

[21] Appl. No.: 172,339

[52] U.S. Cl. ....................................328/109, 328/137

[51] Int. Cl. ................................................H03k 5/20

[58] Field of Search ......328/137, 105, 139; 340/156, 340/171; 343/7.3

[56] References Cited

UNITED STATES PATENTS

| | | | |
|---|---|---|---|
| 3,484,704 | 12/1969 | Hungerford | 343/7.3 |
| 3,575,215 | 4/1971 | Boddy | 328/139 |

*Primary Examiner*—John W. Huckert

*Assistant Examiner*—B. P. Davis

*Attorney*—Homer O. Blair et al.

[57] ABSTRACT

Apparatus for detecting and extracting individual signal video pulse trains from a composite video signal consisting of many individual signal video pulse trains. The apparatus includes a plurality of electronic channels each of which is capable of locking onto an individual signal video pulse train having a pulse repetition frequency (PRF) over a wide bandwidth. The first electronic channel locks up to the signal video pulse train having the highest PRF. After lock-on the channel gates that signal video pulse train out of the composite video signal, and directs the remaining composite video signal to the second electronic channel which locks onto the signal video pulse train having the second highest PRF, and gates that signal video pulse train out of the remaining composite video signal. The second channel then gates the then remaining composite video signal to the third electronic channel wherein the same operation is repeated, etc. Each electronic channel searches for a signal video pulse train which may have a PRF within a given range by utilizing gating circuitry which first attempts to gate a signal video pulse train with a high PRF and then in a continuous manner attempts to gate a signal video pulse train with a lower and lower PRF. Lock-on is indicated by the sequential passage through the gating circuitry of a series of video pulses with a particular PRF. After lock-on is indicated, the searching function is terminated for that particular electronic channel. The gating circuitry has early, mid, and late gating windows. The gating circuitry detects which gating window the signal video pulse train is passing through, and the timing of the gating circuitry is then finely adjusted accordingly to gate the signal video pulse train through the mid gating window. In this manner the timing of the gating circuitry may be shifted slightly either forward or backward in time to center the signal video pulse train at the mid gating window.

34 Claims, 6 Drawing Figures

Walter C. Newman
Andrew R. Cohen
INVENTORS.

BY William C. Roch

ATTORNEY.

Walter C. Newman
Andrew R. Cohen
INVENTORS.
BY William C Roch
ATTORNEY.

Walter C. Newman
Andrew R. Cohen
INVENTORS.
BY William C. Roch
ATTORNEY.

PULSE TRAIN SORTER

BACKGROUND OF THE INVENTION

The present invention relates generally to circuitry for detecting and sorting out individual signal video pulse trains from a composite video signal consisting of a plurality of individual signal video pulse trains. More particularly, the present invention pertains to a new and improved signal video pulse train detector and sorter system having a plurality of electronic channels for sorting out a plurality of signal video pulse trains from a composite video signal. Each electronic channel locks onto one signal video pulse train, and each channel is capable of scanning a wide bandwidth of pulse repetition frequencies (PRFs) to enable lock-on to a particular signal video pulse train.

In the field of signal video pulse train detection and sorting, it has been the general practice to employ signal video pulse train detector circuits wherein each detector circuit is only capable of detecting a signal video pulse train in a very narrow PRF range. These detector circuits could not search for or detect signal video pulse trains over a wide bandwidth. In order to detect signal video pulse trains over a wide bandwidth, a plurality of detector circuits, each occupying a fixed adjacent position in the bandwidth, generally had to be employed. If it were desired to detect one signal video pulse train somewhere in a bandwidth having a PRF range of 10 to 1, then typically numerous adjacent detector circuits had to be utilized to cover the ten to one PRF bandwidth. Further, if it were desired to lock onto more than one signal pulse video pulse train, then typically the number of detector circuits had to be increased. More detector circuits were required as different signal video pulse trains might have the same PRF, but be displaced in phase relative to one another. If only one set of adjacent detector circuits were provided, the particular detector circuit operating at the PRF of two signal video pulse trains would lock onto the first signal video pulse train, and the second signal video pulse train would go undetected. In this prior art arrangement, if it were desired to lock onto six different signal video pulse trains over a ten to one PRF bandwidth then the number of detector circuits required to ensure that all six incoming signal video pulse trains were detected would have been generally impractical to build. Also, this arrangement is unsatisfactory as the expense and size of the resulting detection system would be undesirable. Further, the vast number of electronic components employed by the large number of detector circuits introduces greater unreliability into the system.

SUMMARY OF THE INVENTION

In accordance with a preferred embodiment a system is disclosed for detecting and sorting individual signal video pulse trains from a composite video signal while utilizing only a small number of circuits. Further, the preferred embodiment provides a system wherein each detector circuit, after locking onto a signal video pulse train, subtracts that signal video pulse train from the composite video signal, and then feeds the remaining composite video signal to the next circuit for detection of another signal video pulse train. Also, the preferred embodiment provides a signal video pulse train detector and sorter system which is relatively small, lightweight, and employs a minimum number of electronic components.

Further, an embodiment of a signal video pulse train detector circuit is disclosed which is capable of detecting a signal video pulse train located somewhere within a large bandwidth. The preferred embodiment sweeps the bandwidth in a continuous manner to detect a signal video pulse train located somewhere in that bandwidth, and then locks onto the detected signal video pulse train. Further, the preferred embodiment provides a detector circuit which enables the anticipation of incoming video pulses in the signal video pulse train after lock-on. This capability of anticipation can be used very advantageously to receive the anticipated video pulse, and electronically manipulate circuits to accomplish a desired transformation.

In one embodiment a system was constructed to detect six separate signal video pulse trains within a bandwidth having a ten to one frequency range. Signal video pulse trains were detected in the bandwidth of from 700 pulses per second to 7,000 pulses per second.

GLOSSARY OF TERMS

In the following description of a preferred embodiment, the utilized terminology is defined as follows:

Signal Video: A repetitive pulse train associated with a single radar emitting source.

Composite Video: A number of repetitive pulse trains each associated with a single radar emitting source.

Gated Composite Video: Composite video with prior channels of sorter video removed.

Sorter Video: The output signal video of a lock-up sorter channel.

Early Window: A fixed period of time associated with the count six of a clock.

Mid Window: A fixed period of time associated with the count seven of a clock.

Late Window: A fixed period of time associated with the count eight of a clock.

Extended Late Window: A period of time associated with the count nine of a clock.

Composite Window: A period of time equivalent to the sum of the early, mid and late window times.

Combined Composite Window: The sum of composite windows from prior sorter channels.

Sorter Lock-Up High: Logic level one during sorter channel lock-up mode.

Sorter Lock-Up Low: Complement of sorter lock-up high during sorter channel search mode.

DESCRIPTION OF A PREFERRED EMBODIMENT

Figure 1:
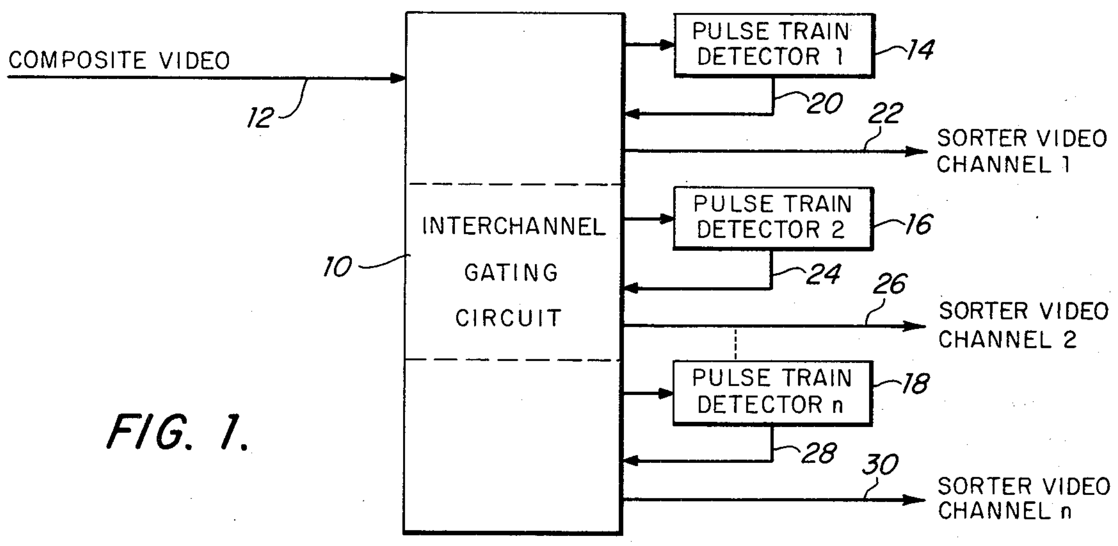
FIG. 1 illustrates a block diagram of one embodiment of a system for detecting and sorting individual signal video pulse trains from a composite video signal consisting of a plurality of signal video pulse trains.

FIG. 1 illustrates a block diagram of one embodiment of a system for detecting and sorting individual signal video from a composite video. The system includes a plurality of similar electronic channels each of which detects one signal video. Composite video enters the interchannel gating circuit 10 on input line 12, and is passed to the first signal video detector circuit 14. The first detector circuit locks onto the signal video having the highest PRF, and develops a composite window signal 20 for that signal video which is directed to the interchannel gating circuit 10 over line 20. The interchannel gating circuit utilizes the composite window to subtract that signal video from the composite video. The subtracted signal video, termed the shorter video, appears as an output on line 22. The remaining composite video is fed to detector circuit 16, which develops a composite window for the signal video having the second highest PRF, and this composite window is directed to the interchannel gating circuit 10 over line 24. The interchannel gating circuit 10 utilizes this composite window to subtract that signal video from the remaining composite video. In a like manner, the then remaining composite video is processed through n electronic channels to obtain n sorter video outputs.

Figure 2:
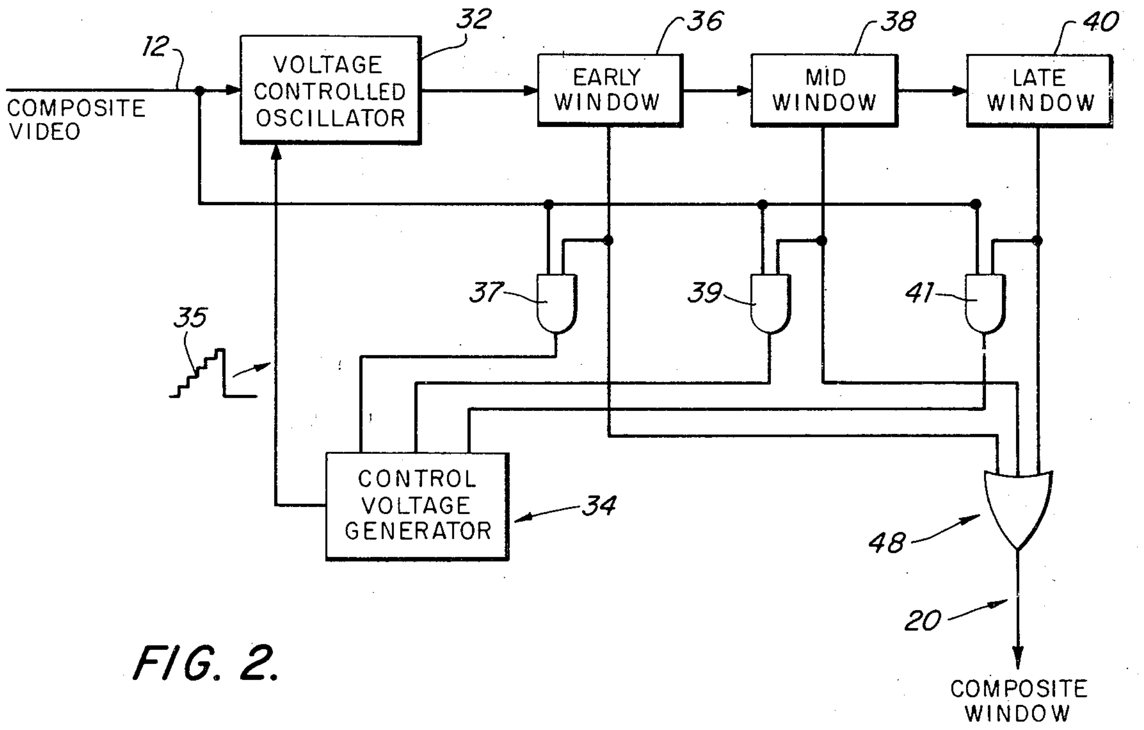
FIG. 2 illustrates a simplified block diagram of one embodiment of a signal video pulse train detector circuit utilized in each stage of the system shown in FIG. 1.

FIG. 2 illustrates a simplified block diagram of one embodiment of a signal video detector circuit for the first electronic channel, shown as block 14 in FIG. 1. Composite video enters on line 12, and is directed to voltage controlled delay circuit 32 wherein each video pulse syncs a variable delay circuit, the actual delay period of which is determined by the voltage applied to delay circuit 32 by control voltage generator 34. After the variable delay imposed by delay circuit 32, three fixed period windows, an early window, a mid window, and a late window, are sequentially generated by multistable multivibrators 36, 38 and 40. Early, mid and late multistable multivibrators 36, 38 and 40 generate respectively negative, zero and positive charging signals for circuit 34. An OR gate 48 combines the early, mid and late windows to generate an output on line 20 called the composite window.

Basically, the circuit operates as follows. Control voltage generator 34 initially causes the detector circuit to search for signal videos with different PRFs by varying the voltage applied to delay circuit 32. Control voltage generator 34 generates a staircase waveform 35 which slowly increases in time, and applies that voltage to voltage controlled delay circuit 32. The slowly increasing voltage applied to delay circuit 32 delays the circuit's output by a greater and greater amount. This search function is halted after the successive detection in coincidence by gate 39 of a number of video pulses through the mid window. Circuit 34 then locks onto the detected signal video by controlling the voltage level applied to delay circuit 32. Early, mid and late windows are utilized for fine control of the voltage applied to delay circuit 32. Circuit 34 senses an output from either the early, mid or late gates 37, 39 or 41 when a gate receives a window coincident in time with an undelayed video pulse on line 12. If the early window is coincident in time, then a small negative voltage increment is applied to the delay circuit control voltage, thereby causing the delay circuit 32 to produce less delay so input pulses will be coincident in time with the mid window. If the undelayed video pulses are coincident in time with the mid window then the voltage being applied to delay circuit 32 is substantially correct, and no change in voltage is required. If the circuit 34 senses that undelayed video pulses are coincident in time with the late window, then a small positive voltage increment is added to the voltage being applied to delay circuit 32 thereby causing the delay circuit 32 to produce more delay so the next input pulse will be coincident in time with the mid window. The early and late windows also ensure that a locked pulse train is locked even though there may be jitter in the signal video.

Figure 3:
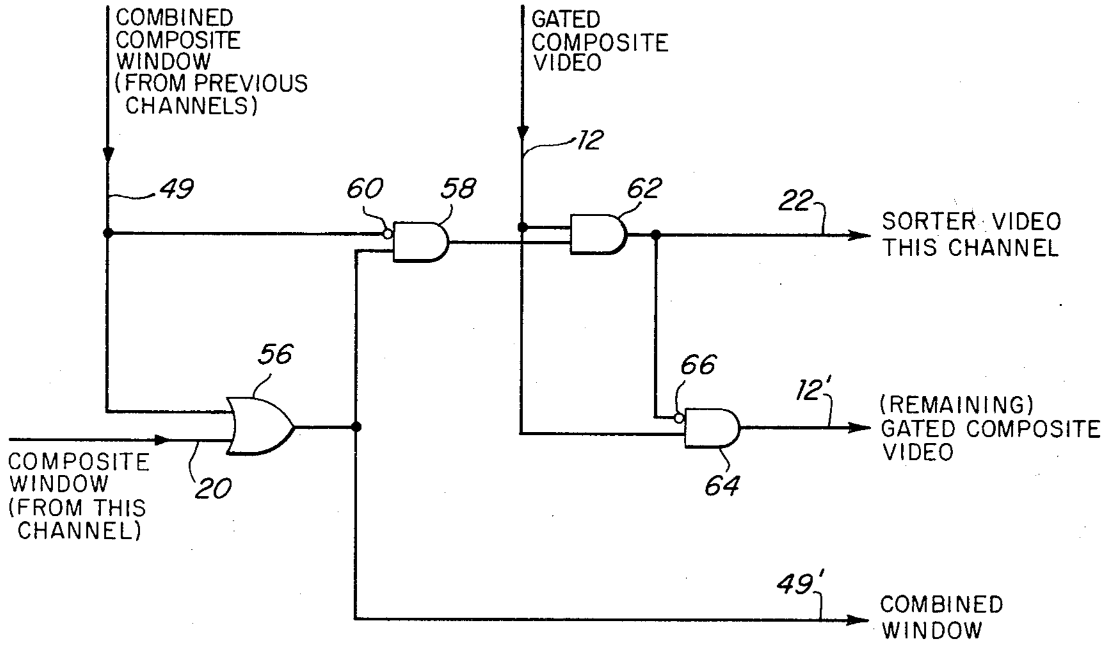
FIG. 3 shows one embodiment of one stage of the interchannel gating circuit illustrated in FIG. 1.

FIG. 3 shows one embodiment of one stage of the interchannel gating circuit 10 shown in FIG. 1. The circuit of FIG. 3 operates as follows. Assume that the illustrated circuit is for the third electronic channel so that the first two electronic channels have already gated out first and second signal videos and developed composite windows for the first and second channels. The second channel of the interchannel gating circuit will have generated a combined composite window for the third channel which is the sum of composite windows for all prior channels (the first and second channels). OR gate 56 receives the combined composite window for the first and second electronic channels over line 49 and a composite window for the third channel over line 20. The output on line 49' is the combined composite window to the fourth electronic channel. AND gate 58 produces an output if there is a composite window present for the third electronic channel and no combined composite window present (indicated by the notation 60) for the previous first and second electronic channels. AND gate 62 receives the output from AND gate 58 and the gated composite video on line 12, which has already had the sorter video of the first and second channels removed, and produces the sorter video channel three output on line 22. AND gate 64 produces an output signal on line 12', the gated composite video for the fourth channel, when a video pulse is present from the gated composite video on line 12 and no video pulse is present from the sorter video channel three on line 22.

Figure 4:
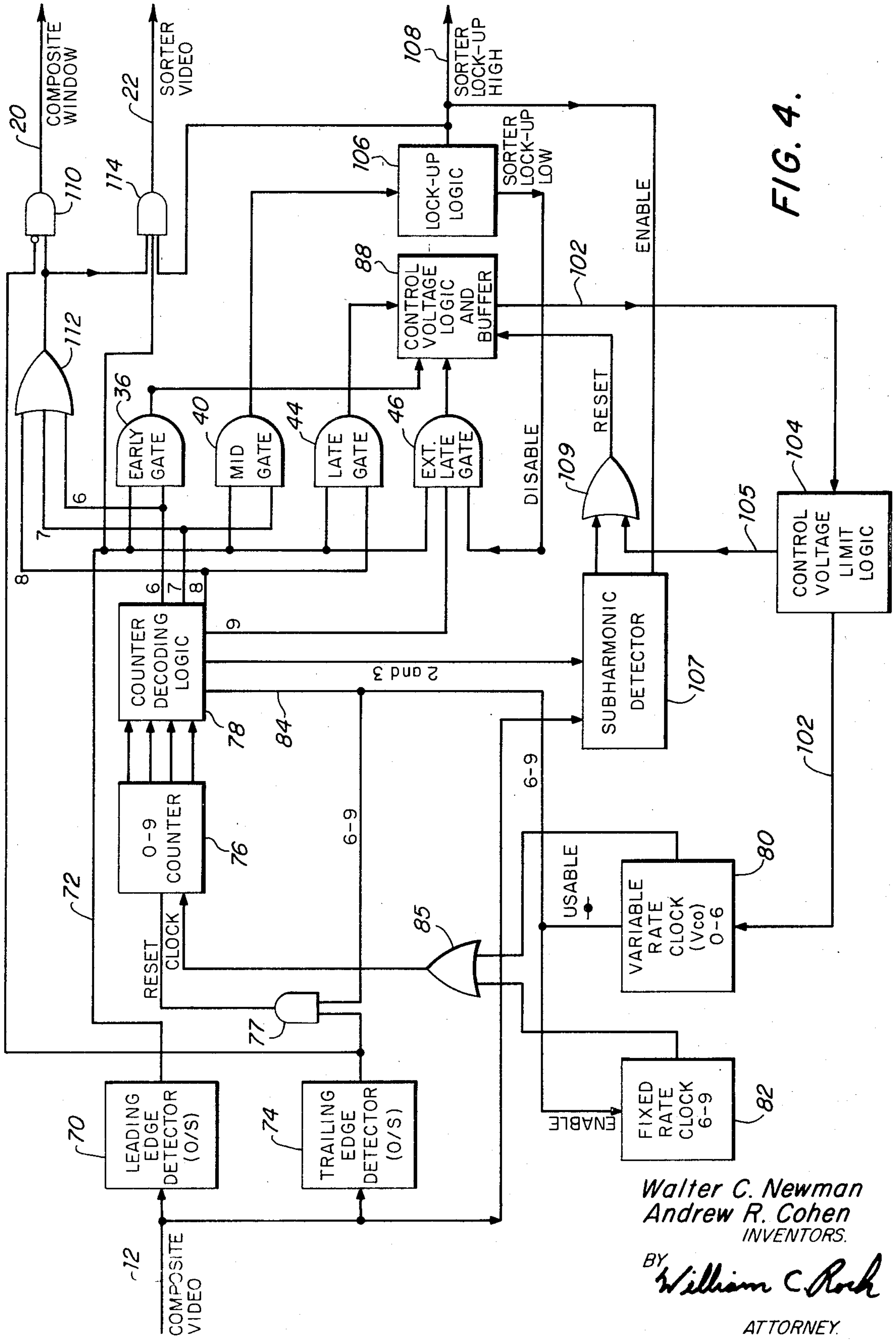
FIG. 4 is a detailed block diagram of one embodiment of a signal video pulse train detector circuit illustrated broadly in FIG. 2.

FIG. 4 is a detailed block diagram of one embodiment of a signal video pulse train detector circuit illustrated broadly in FIG. 2. Composite video on input line 12 is directed to leading edge detector circuit 70 and trailing edge detector circuit 74, each of which produces a pulse at its output when a proper edge is detected, and each of which may be a one shot multivibrator. The output of leading edge detector circuit 70, which is similar to composite video on line 12, is directed over line 72 to early gate 36, mid gate 40, late gate 44, and extended late gate 46. The other inputs to the early, mid, late and extended late gates are respectively generated by the six, seven, eight and nine counts of a zero to nine counter 76. Counter 76 develops a binary count which is decoded to an arabic numeral count by circuit 78. Zero to nine counter 76 is driven through OR gate 85 by a variable rate clock circuit 80 and a fixed rate clock circuit 82. Variable clock circuit 80 is a voltage controlled oscillator which counts from zero to six at a rate determined by the voltage on line 102. At the count of six and through the count of nine, circuit 78 produces an output on line 84 which disables clock 80 and enables clock 82. Clock 82 then continues the count through nine at a fixed counting rate.

Counter decoding logic circuit 78 directs the count of six to early gate 36 to enable it during the count of six, then directs the count of seven to mid gate 40 to enable it during the count of seven, then directs the count of eight to late gate 44 to enable it during the count of eight, and finally directs the count of nine to extended late gate 46 to enable it during the count of nine. Early gate 36 produces an output signal if it receives a video pulse on line 72 during the count of six. Mid gate 40 produces an output if it receives a video pulse on line 72 during the count of seven. Late gate 44 produces an output if it receives a video pulse on line 72 during the count of eight. Extended late gate 46 produces an output if it receives a video pulse during the count of nine and further if it is not disabled by lock up logic circuit 106 for reasons explained later.

The circuit of FIG. 4 operates as follows. Voltage controlled clock 80 initially directs counts one through the start of count six to counter 76 at a very fast rate, which is determined by the highest PRF desired to be detected. Fixed rate clock 82 then directs counts seven through nine to counter 76. If a video pulse is received on line 72 during the six through eight count, control voltage logic and buffer 88 maintains approximately the same voltage on line 102 to keep voltage controlled clock 80 counting at approximately the same rate. If however, counts six through eight lapse without the receipt of a video pulse on line 72, the count of nine is maintained for an extended period of time to enable extended late gate 46 until the arrival of the next video pulse, which causes gate 46 to produce an output signal. The output signal from gate 46 causes circuit 88 to increase the voltage on line 102 by a discrete step to slow down the counting rate of voltage controlled clock 80. The same cycle is then repeated at the slower counting rate to determine if a video pulse will arrive during the six through eight count. If a video pulse is not received during the six through eight count of the slower counting rate, then extended late gate 46 causes voltage generator 88 to generate a still higher voltage on line 102 to cause voltage controlled clock 80 to count at a still slower rate. This operation is repeated until a video pulse is received during the six through eight count, or until the voltage on line 102 reaches a predetermined limit at which control voltage limit logic 104 produces an output which triggers OR gate 109 which in turn causes circuit 88 to reset itself to produce a zero voltage output signal on line 102. The voltage limit at which circuit 104 resets circuit 88 through OR gate 109 determines the lowest PRF which may be detected. The entire searching operation is then repeated with variable clock 80 causing the circuit to search again for signal video over the desired bandwidth, which is determined by the range of counting rates of variable clock 80. When a video pulse is received during the six through nine count, AND gate 77 generates an output to reset the counter 76 thereby syncing the count of zero to the trailing edge of the incoming pulse train.

The early and late gates are utilized to finely adjust the circuit to the pulse repetition interval of the detected signal video. If a video pulse is received on line 72 during the count of six, early gate circuit 36 generates an output which causes circuit 88 to decrease the voltage on line 102 by a slight incremental amount. This slight incremental amount is sufficient so that future video pulses in the signal video will arrive during the count of seven. Likewise, if a video pulse is received on line 72 during the count of eight, late gate 44 generates an output which causes circuit 88 to increase the voltage on line 102 by a slight incremental amount. This slight incremental amount is sufficient so that future video pulses in the signal video will arrive during the count of seven. If the video pulse is received during the count of seven, mid gate 40 generates a signal which is directed to lock up logic circuit 106. In this instance a correction signal is not fed to control voltage 88, and the voltage on line 102 remains at the same value. Lock-up logic circuit 106 produces a sorter lock-up high signal to disable extended late gate 46 if it receives a predetermined number of signals in sequence from mid gate 40. Lock-up logic circuit 106 is provided to ensure that, after lock onto a pulse train, the extended late gate 46 does not reinstitute a search mode if one of the video pulses in the signal video is accidentally dropped by the circuit or if one or more of the video pulses was accidentally gated out of the signal video by one of the previous electronic channels. Typically, lock-up logic circuit 106 may be triggered by the arrival of four signals from mid gate 40 in sequence to produce a sorter lock-up high signal which is renewed every time four new video pulses arrive in sequence. The presence of a sorter lock-up high signal on line 108 activates a subharmonic detector 107 which tests the sorter video to determine if the locked-on sorter video is a subharmonic of an incoming signal video. Mathematically it works out that if the second, third, fourth, sixth or eighth subharmonic of a signal video is lock onto, there will be a video pulse present shortly after the count of two or the count of three. The subharmonic detector 107 detects whether the sorter video is the second, third, fourth, sixth or eighth subharmonic of a signal video by checking for the consistent presence of a video pulse shortly after the count of two or the count of three. If a video pulse is received within a short period of time, typically 5 microseconds, after the start of the count of two or the start count of three for a number of times in sequence, typically four, then subharmonic detector circuit 107 indicates that the locked-on sorter video is a subharmonic of a signal video, and circuit 107 resets circuit 88 through OR gate 109 to reinstitute a search mode so that the detector circuit can lock onto the fundamental signal video instead of a subharmonic thereof.

The circuit of FIG. 4 produces three output signals. The first output signal is the composite window output signal on line 20, which is produced by AND gate 110 when it simultaneously receives a signal from OR gate 112 during the counts of six, seven or eight, and a lack of a signal from trailing edge detector 74. It should be noted that the composite window on line 20 is the signal which is produced in anticipation of the next input video pulse in the component pulse train. This capability of anticipation can be used advantageously to anticipate a received video pulse, and electronically manipulate circuits to accomplish a desired transformation. A second output signal is produced on line 22 and is called sorter video and is the video signal that the channel is locked to. This second output signal is produced by AND gate 114 and when it simultaneously receives a signal from lockup logic 106, an input video pulse on line 72, and a composite gating from OR gate 112. The third output signal is produced on line 108, and is indicative that the detection circuit has locked onto a given signal video.

Figure 5:
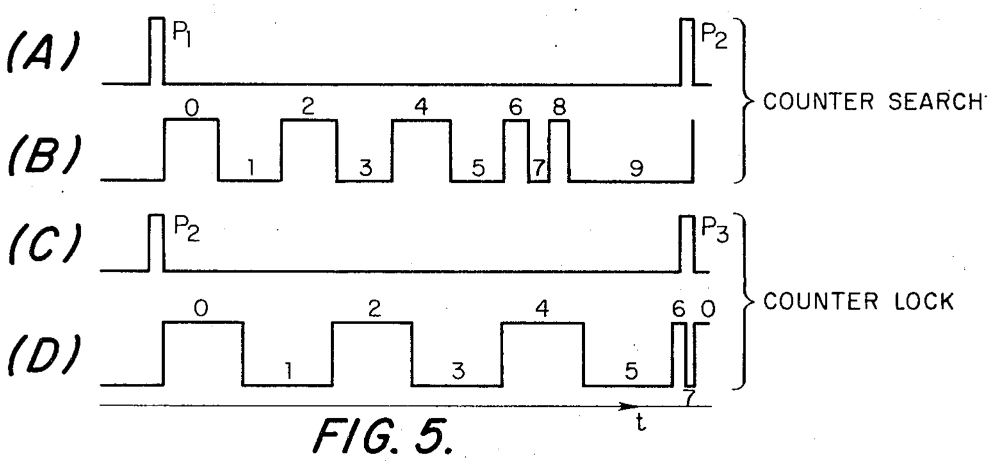
FIG. 5 illustrates several waveforms useful in explaining the operation of the circuit of FIG. 4.

FIG. 5 illustrates one cycle of operation of the circuit for a signal video indicated in 5(A). The counter 78 is initially at a count of nine, and an input video pulse $P_1$ triggers the counter 76 via gate 77 to start counting. Variable clock 80 counts the cycles zero to five as shown in 5(B). As the count of six is initiated by clock 80, a signal on line 84 disables variable clock 80 and enables fixed rate clock 82. Fixed rate clock 82 then counts six to nine as shown in 5(B). If, as illustrated in 5(A), a second pulse $P_2$ is not received during the count of six to eight, the circuit 78 remains at the count of nine, with a nine count enabling extended late gate 46. When video pulse $P_2$ arrives during the nine count, extended late gate 46 directs an output signal to circuit 88 to cause it to produce a more positive voltage on line 102 to change the counting rate of variable clock 80 to the rate illustrated in 5(D). In the illustrated example the longer count causes video pulse $P_3$ to arrive during the seven count. The arrival of video pulse $P_3$ resets the counter 76 via gate 77 for a new count. When a predetermined number of video pulses are received in sequence during the seven count, the lock-up logic circuit 106 disables extended late gate 46. As long as the input video arrives with the PRF shown in FIGS. 5 (A) and 5 (D) the circuit remains locked onto the signal video. This lock up time period is adjustable over a wide period of time.

Figure 6:
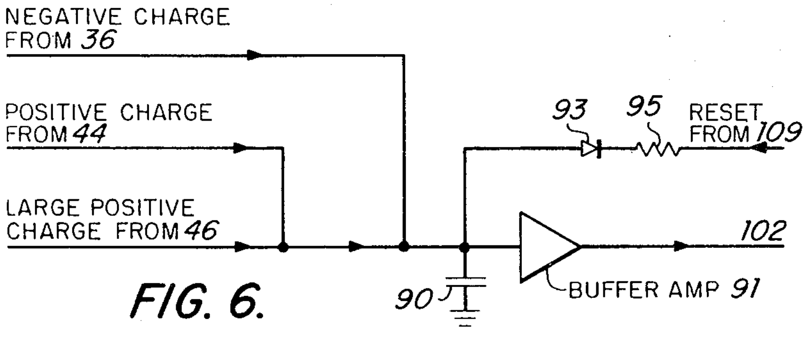
FIG. 6 is a detailed block diagram of one embodiment of the control voltage logic and buffer circuit illustrated broadly in FIG. 4.

FIG. 6 illustrates a detailed block diagram of one embodiment of the control voltage logic and buffer circuit illustrated in FIG. 4. The voltage on line 102 is the voltage across capacitor 90, and buffer amplifier 91 is utilized to sample the voltage on capacitor 90 without changing the value of the voltage. The circuit operates as follows: Assume that the circuit of FIG. 4 has just started a new searching cycle, and that the voltage across capacitor 90 is zero, which causes variable clock 80 to count at its fastest rate which in turn determines the maximum PRF that the circuit will detect. If the circuit goes to the count of nine before a second video pulse is received, the output from extended late gate 46 will deposit a large positive charge on capacitor 90 to increase its voltage by an incremental step. This large positive charge increases the voltage on line 102 to change the counting rate of variable clock 80. If the count again proceeds to the count of nine before a second video pulse is received, the same procedure is repeated. However, if a video pulse is received during the count of six, then the output of early gate 36 will discharge capacitor 90 by a small incremental amount. The amount of this discharge is sufficient to change the counting rate of counter 80 so that subsequent video pulses in the signal video will be received during the count of seven. If the second video pulse is received during the count of eight, the output of late gate 44 will charge capacitor 90 in a positive direction by a small incremental amount. This slight positive charge is sufficient to change the counting rate of counter 80 so that subsequent video pulses in the input video will be received during the count of seven. OR gate 109 produces an output signal which causes diode 93 to discharge capacitor 90 through resistor 95.

Although the preferred embodiment has been described with respect to input video pulse trains received by radar emitting sources, the teachings of this invention have applicability to all fields in which pulse train detection and sorting are utilized.

Although one embodiment of a particular detection circuit has been illustrated, many other embodiments could also be developed. For instance, the counting system might utilize a different number of counts. Also, circuitry might be added to detect whether a subharmonic pulse train has been locked onto. While several embodiments have been described, the teachings of this invention will suggest many other embodiments to those skilled in the art.

I claim

1. Apparatus for sorting component pulse trains from a first composite pulse train which includes a plurality of component pulse trains, and comprising:

a. a first electronic channel including detecting means, having a given pulse repetition frequency range, for detecting the component pulse train in the first composite pulse train having the highest pulse repetition frequency within said pulse repetition frequency range of the detecting means of said first electronic channel, and means for removing the detected component pulse train from the first composite pulse train to produce a second composite pulse train; and b. a second electronic channel including means for receiving said second composite pulse train, detecting means, having a given pulse repetition frequency range, for detecting the component pulse train in the second composite pulse train having the highest pulse repetition frequency within said pulse repetition frequency range of the detecting means of said second electronic channel, and means for removing the detected component pulse train from said second composite pulse train, whereby each electronic channel detects the component pulse train then present in the composite pulse train having the highest pulse repetition frequency within its pulse repetition frequency range, removes the detected component pulse train from the composite pulse train, and passes the remaining composite pulse train to the next electronic channel for a repetition of the same operation.

2. Apparatus as set forth in claim 1 wherein said detecting means in each electronic channel includes:

a. gating means, responsive to gating signals, for gating a pulse train having a given pulse repetition frequency within a given bandwidth;

b. means for developing gating signals for said gating means for enabling said gating means to gate a pulse train having a given pulse repetition frequency;

c. sweeping means for causing said developing means to sweep the frequency of the developed gating signals over the given bandwidth until a pulse train is gated by said gating means to enable said gating means to sequentially gate pulse trains with different pulse repetition frequencies over the given bandwidth until a pulse train having a given pulse repetition frequency is gated; and d. means for detecting the gating of a pulse train by said gating means and for maintaining the gating signals at the pulse repetition frequency of the pulse train being gated by said gating means in response to the detection of a gated pulse train, whereby the gating signals are swept through different pulse repetition frequencies until a pulse train is gated, and then said sweeping means is disabled to allow the continued gating of the pulse train by said gating means.

3. Apparatus as set forth in claim 2 wherein:

a. said developing means includes timing means for establishing a variable time interval, and means for developing said gating signal after the passage of said variable time interval; and b. said sweeping means includes means for controlling said timing means for causing said timing means to establish different time intervals.

4. Apparatus as set forth in claim 3 wherein:

a. said timing means includes a first clock means for generating clock signals, and a counting means for counting said clock signals; and b. said sweeping means includes means for controlling the counting rate of said first clock means.

5. Apparatus as set forth in claim 4 wherein:

a. said developing means includes a second clock means for generating said gating signals; and b. said counting means includes means for enabling said second clock means after said counting means counts a given number of clock signals from said first clock means.

6. Apparatus as set forth in claim 5 wherein:

a. said gating means includes an early gate, a mid gate and a late gate;

b. said second clock means includes means for generating an early gating signal for said early gate, a mid gating signal for said mid gate, and a late gating signal for said late gate; and c. said means for detecting the gating of a pulse train includes means, responsive to the gating of a pulse by said early gate or said late gate, for finely adjusting the counting rate of said first clock means to cause the detected pulse train to be gated by said mid gate.

7. Apparatus as set forth in claim 6 wherein said sweeping means includes means for generating a staircase voltage pattern to cause said developing means to sweep the frequency of the gating signals in a number of discrete steps over the given bandwidth.

8. Apparatus as set forth in claim 7 wherein:

a. said gating means further includes an extended late gate;

b. said developing means includes means for generating an extended late gating signal for said extended late gate after the generation of said late gating signal to enable said extended late gate to gate a pulse after the expiration of said late gating signal; and c. said sweeping means includes means for generating another step in said staircase voltage pattern in response to the gating of a pulse by said extended late gate.

9. Apparatus as set forth in claim 8 and further including a lock-up means for locking said gating signal at a given pulse repetition frequency after the successive gating in sequence of a predetermined number of pulses of the detected pulse train by said gating means.

10. Apparatus as set forth in claim 9 and further including means for determining whether the detected pulse train is a subharmonic pulse train of a component pulse train of the composite pulse train.

11. Apparatus as set forth in claim 7 wherein:

a. said gating means further includes an extended late gate;

b. said developing means includes means for generating an extended late gating signal for said extended late gate after the generation of said late gating signal to enable said extended late gate to gate a pulse after the expiration of said late gating signal; and c. said sweeping means includes means for generating another step in said staircase voltage pattern in response to the gating of a pulse by said extended late gate.

12. Apparatus as set forth in claim 2 wherein:

a. said developing means includes means for developing an early gating signal, a mid gating signal, and a late gating signal;

b. said gating means includes an early gate responsive to said early gating signal, a mid gate responsive to said mid gating signal, and a late gate responsive to said late gating signal; and c. said means for detecting the gating of a pulse train includes means responsive to the gating of a pulse by said early or late gate to finely adjust the timing of said gating signal to cause the detected pulse train to be gated by said mid gate.

13. Apparatus as set forth in claim 12 wherein said sweeping means includes means for generating a staircase voltage pattern to cause said developing means to sweep the frequency of the gating signals in a number of discrete steps over the given bandwidth.

14. Apparatus as set forth in claim 2 and further including a lock-up means for locking said gating signal at a given pulse repetition frequency after the successive gating in sequence of a predetermined number of pulses of the detected pulse train by said gating means.

15. Apparatus as set forth in claim 2 and further including means for determining whether the detected pulse train is a subharmonic pulse train of a component pulse train of the composite pulse train.

16. Apparatus for detecting a pulse train, and including:

a. gating means, responsive to gating signals, for gating a pulse train having a given pulse repetition frequency within a given bandwidth;

b. means for developing gating signals for said gating means for enabling said gating means to gate a pulse train having a given pulse repetition frequency; and c. sweeping means for causing said developing means to systematically sweep the frequency of the developed gating signals over the given bandwidth until a pulse train is gated by said gating means to enable said gating means to sequentially gate pulse trains with different pulse repetition frequencies over the given bandwidth until a pulse train having a given pulse repetition frequency is gated.

17. Apparatus as set forth in claim 16 and including means for detecting the gating of a pulse train by said gating means and for maintaining the gating signals at the pulse repetition frequency of the pulse train being gated by said gating means in response to the detection of a gated pulse train, whereby the gating signals are swept through different pulse repetition frequencies until a pulse train is gated, and then said sweeping means is disabled to allow the continued gating of the pulse train by said gating means.

18. Apparatus as set forth in claim 17 wherein:

a. said developing means includes timing means for establishing a variable time interval, and means for developing said gating signal after the passage of said variable time interval; and b. said sweeping means includes means for controlling said timing means for causing said timing means to establish different time intervals.

19. Apparatus as set forth in claim 18 wherein:

a. said timing means includes a first clock means for generating clock signals, and a counting means for counting said clock signals; and b. said sweeping means includes means for controlling the counting rate of said first clock means.

20. Apparatus as set forth in claim 19 wherein:

a. said developing means includes a second clock means for generating said gating signals; and b. said counting means includes means for enabling said second clock means after said counting means counts a given number of clock signals from said first clock means.

21. Apparatus as set forth in claim 20 wherein:

a. said gating means includes an early gate, a mid gate and a late gate;

b. said second clock means includes means for generating an early gating signal for said early gate, a mid gating signal for said mid gate, and a late gating signal for said late gate; and c. said means for detecting the gating of a pulse train includes means, responsive to the gating of a pulse by said early gate or said late gate, for finely adjusting the counting rate of said first clock means to cause the detected pulse train to be gated by said mid gate.

22. Apparatus as set forth in claim 21 wherein said sweeping means includes means for generating a staircase voltage pattern to cause said developing means to sweep the frequency of the gating signals in a number of discrete steps over the given bandwidth.

23. Apparatus as set forth in claim 22 wherein:

a. said gating means further includes an extended late gate;

b. said developing means includes means for generating an extended late gating signal for said extended late gate after the generation of said late gating signal to enable said extended late gate to gate a pulse after the expiration of said late gating signal; and c. said sweeping means includes means for generating another step in said staircase voltage pattern in response to the gating of a pulse by said extended late gate.

24. Apparatus as set forth in claim 23 and further including a lock-up means for locking said gating signal at a given pulse repetition frequency after the successive gating in sequence of a predetermined number of pulses of the detected pulse train by said gating means.

25. Apparatus as set forth in claim 24 and further including means for determining whether the detected pulse train is a subharmonic pulse train of a component pulse train of the composite pulse train.

26. Apparatus as set forth in claim 22 wherein:

a. said gating means further includes an extended late gate;

b. said developing means includes means for generating an extended late gating signal for said extended late gate after the generation of said late gating signal to enable said extended late gate to gate a pulse after the expiration of said late gating signal; and c. said sweeping means includes means for generating another step in said staircase voltage pattern in response to the gating of a pulse by said extended late gate.

27. Apparatus as set forth in claim 16 wherein:

a. said developing means includes timing means for establishing a variable time interval, and means for developing said gating signal after the passage of said variable time interval; and b. said sweeping means includes means for controlling said timing means for causing said timing means to establish different time intervals.

28. Apparatus as set forth in claim 27 wherein:

a. said timing means includes a first clock means for generating clock signals, and a counting means for counting said clock signals; and b. said sweeping means includes means for controlling the counting rate of said first clock means.

29. Apparatus as set forth in claim 28 wherein:

a. said developing means includes a second clock means for generating said gating signals; and b. said counting means includes means for enabling said second clock means after said counting means counts a given number of clock signals from said first clock means.

30. Apparatus as set forth in claim 29 wherein:

a. said gating means includes an early gate, a mid gate and a late gate;

b. said second clock means includes means for generating an early gating signal for said early gate, a mid gating signal for said mid gate, and a late gating signal for said late gate; and c. said means for detecting the gating of a pulse train includes means, responsive to the gating of a pulse by said early gate or said late gate, for finely adjusting the counting rate of said first clock means to cause the detected pulse train to be gated by said mid gate.

31. Apparatus as set forth in claim 17 wherein:

a. said developing means includes means for developing an early gating signal, a mid gating signal, and a late gating signal;

b. said gating means includes an early gate responsive to said early gating signal, a mid gate responsive to said mid gating signal, and a late gate responsive to said late gating signal; and c. said means for detecting the gating of a pulse train includes means responsive to the gating of a pulse by said early or late gate to finely adjust the timing of said gating signal to cause the detected pulse train to be gated by said mid gate.

32. Apparatus as set forth in claim 16 wherein said sweeping means includes means for generating a staircase voltage pattern to cause said developing means to sweep the frequency of the gating signals in a number of discrete steps over the given bandwidth.

33. Apparatus as set forth in claim 16 and further including a lock-up means for locking said gating signal at a given pulse repetition frequency after the successive gating in sequence of a predetermined number of pulses of the detected pulse train by said gating means.

34. Apparatus as set forth in claim 16 and further including means for determining whether the detected pulse train is a subharmonic pulse train of a component pulse train of the composite pulse train.

* * * * *